3,419,782
DIRECT CURRENT COMMUTATION SYSTEM FOR BRUSHLESS ELECTRICAL MOTORS
Leonard J. Sheldrake and Jerrold L. Mullen, Anderson, Ind., assignors to General Motors Corporation, Detroit, Mich., a corporation of Delaware
Filed Sept. 20, 1965, Ser. No. 488,473
7 Claims. (Cl. 321—5)

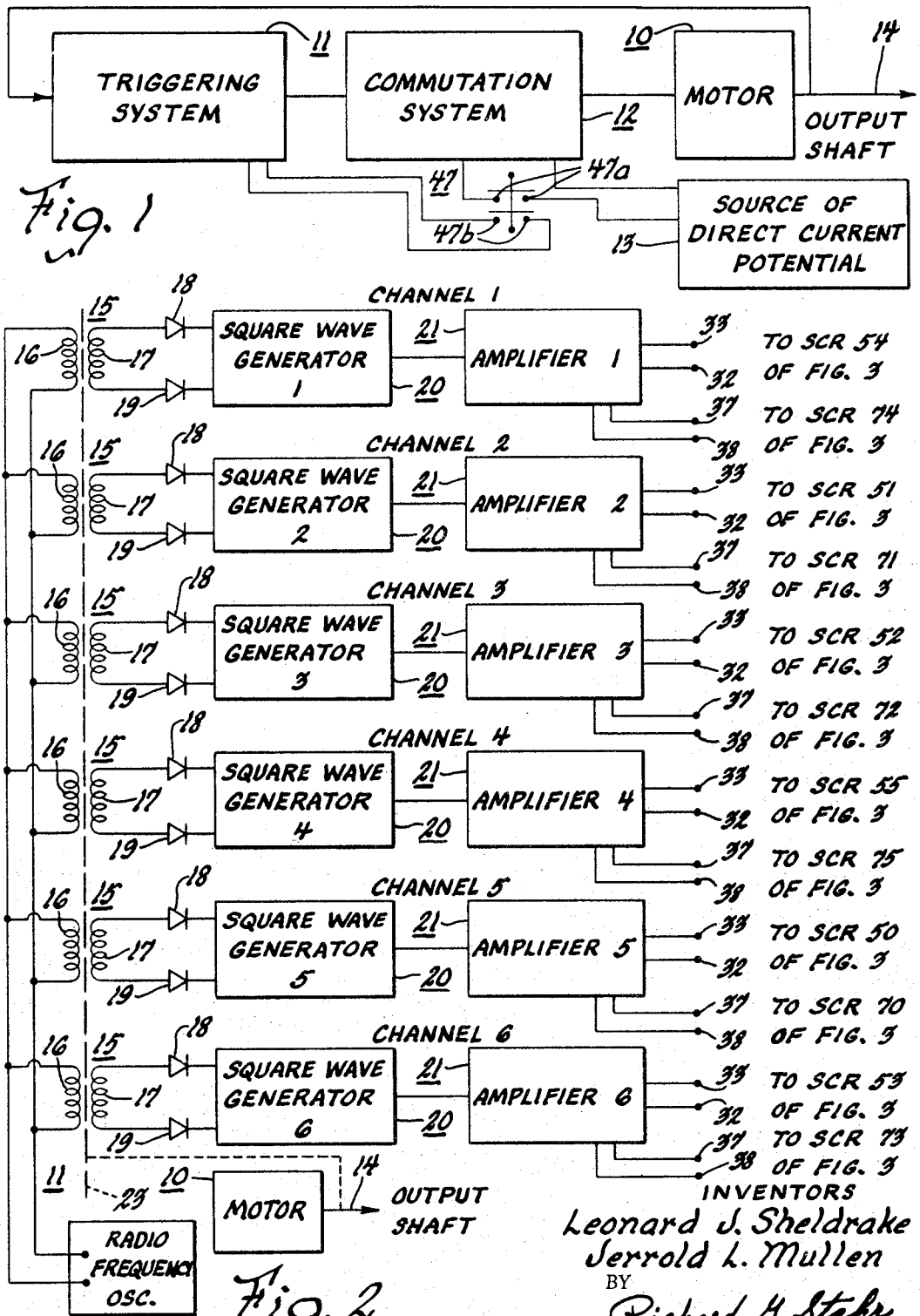

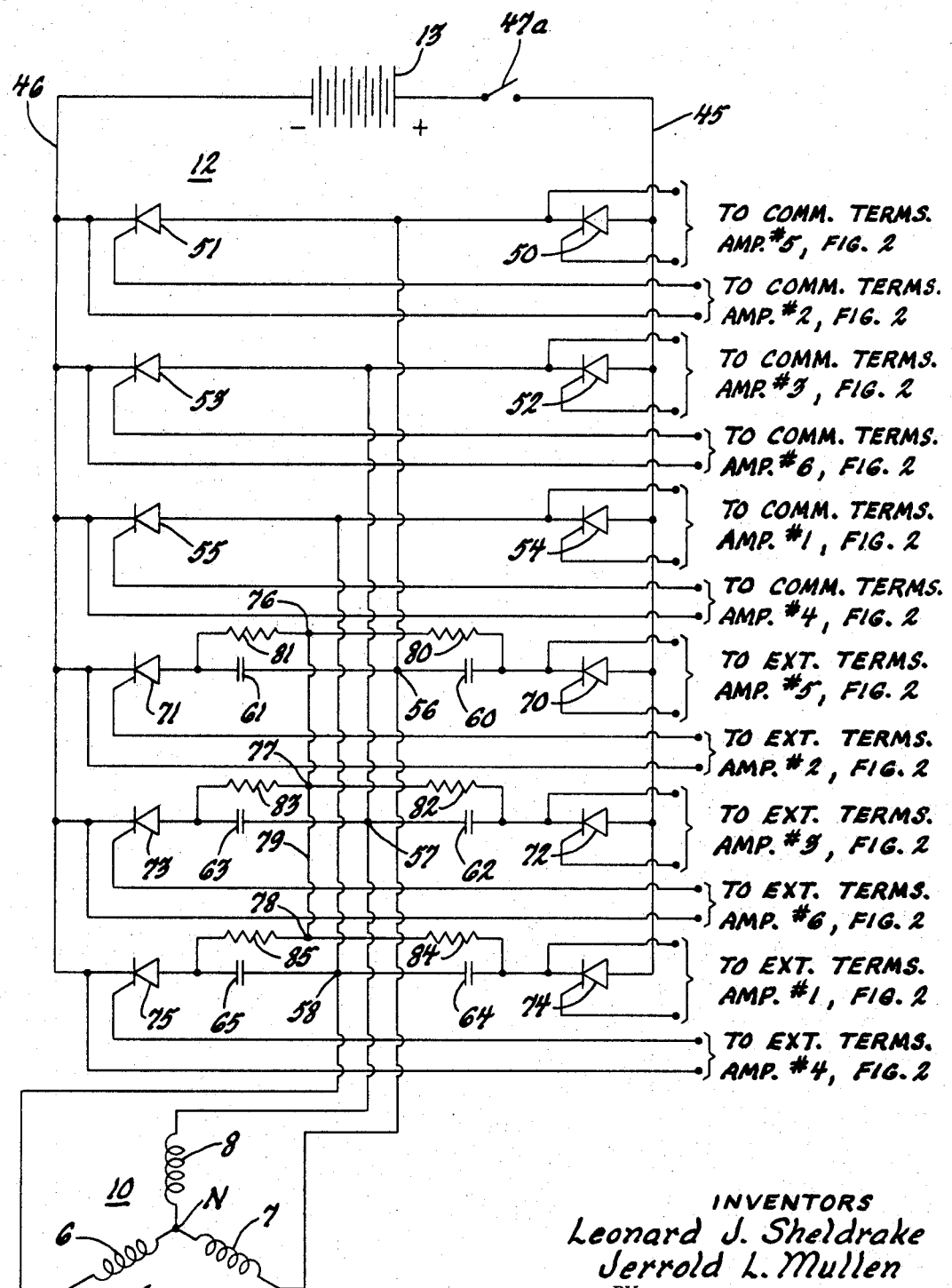
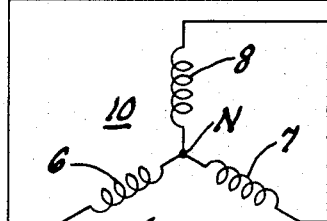
Fig. 3
INVENTORS
Leonard J. Sheldrake
Jerrold L. Mullen
BY
Richard G. Stahr
THEIR ATTORNEY INVENTORS
Leonard J. Sheldrake
Jerrold L. Mullen
BY
Richard G. Stahr
THEIR ATTORNEY INVENTORS
Leonard J. Sheldrake
Jerrold L. Mullen
BY
Richard G. Stahr
THEIR ATTORNEY United States Patent Office 3,419,782
Patented Dec. 31, 1968

ABSTRACT OF THE DISCLOSURE

A commutating system for operating brushless type alternating current induction motors from a direct current potential source. The series combination of two silicon controlled rectifiers corresponding to each motor phase winding is connected in series across a direct current potential line. Also connected in series across the direct current potential line is an extinguishing silicon controlled rectifier, two extinguishing capacitors and another extinguishing silicon controlled rectifier corresponding to each series combination of commutating silicon controlled rectifiers. Connected across each capacitor pair is the series combination of two resistors having the junction between each pair connected together. The junction between each series connected commutating silicon controlled rectifier pair and the junction between the corresponding extinguishing capacitors are connected to a respective motor winding. With this arrangement, the capacitors are initially charged across the line with the correct polarity relationship to extinguish the corresponding commutating silicon controlled rectifier when the corresponding extinguishing silicon controlled rectifier is triggered conductive. Each extinguishing silicon controlled rectifier is extinguished by the charge supplied by the collapsing magnetic field in the motor winding placed upon the corresponding capacitor.

Figure 4:
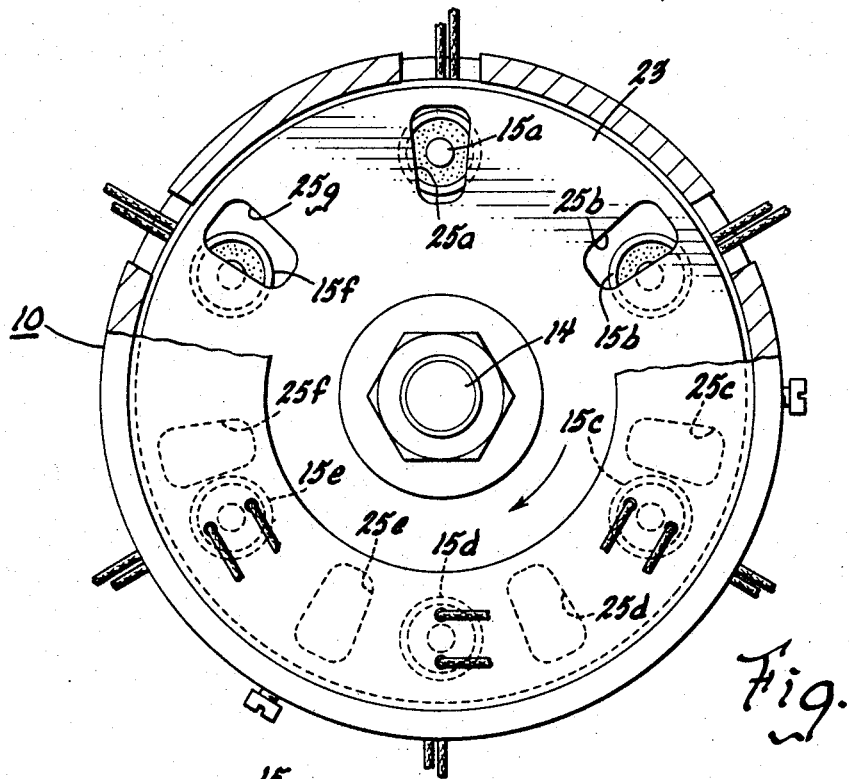

The present invention relates to a direct current commutation system for brushless type electrical motors and, more specifically, to a system of this type having an improved commutating switch extinguishing circuit.

Recently, there has been increased activity in the development of electrical motor propulsion systems. For this application, the most desirable electrical motor is one which produces a high torque under stall and low speed conditions and which is capable of operation at very high speeds. These two requirements are somewhat contradictory, at least when considering conventional machines. The high stall torque is characteristic of direct current motors while the high speed capability is generally attainable only in alternating current motors with no brushes or commutator. An ideal propulsion motor for high speed applications would be one which has the high speed capabilities of an alternating current motor without the commutator and brush limitations inherent in direct current motors. Therefore, a logical selection selection would be an alternating current polyphase motor commutated as a direct current motor but without a commutator or brushes. That is, a brushless direct current commutated alternating current motor.

One system of this type employs a polyphase alternating current induction type machine, a solid state commutation system and a triggering system coupled to the output shaft of the motor. The commutation system performs the function normally accomplished by the commutator and brushes of a direct current motor, while the triggering system relates the switching action to shaft position as does the commutator in a conventional direct current motor. Thus, the motor exhibits characteristics identical to those of a direct current motor but, since the machine itself is an alternating current motor, its rotor may be designed to have the structural integrity which permits high speed operation.

As the commutation system eliminates the requirement of a commutator and brushes, it is perhaps the most important element of this system, therefore, the requirement of a reliable, durable and inexpensive commutation system is apparent.

It is, therefore, an object of this invention to provide an improved direct current commutation system for brushless type electrical motors.

It is another object of this invention to provide an improved direct current commutation system for brushless type electrical motors having an improved commutating switch extinguishing circuit.

In accordance with this invention, an improved direct current commutation system for brushless type electrical motors is provided wherein each one of a plurality of commutating switching devices each having two current carrying electrodes and a control electrode and being of the type which may be extinguished by the application of an electrical charge in a reverse polarity relationship across the current carrying electrodes thereof are extinguished by selectively applying the electrical charge stored in a corresponding electrical charge storage device in a reverse polarity relationship across the current carrying electrodes thereof.

Figure 5:
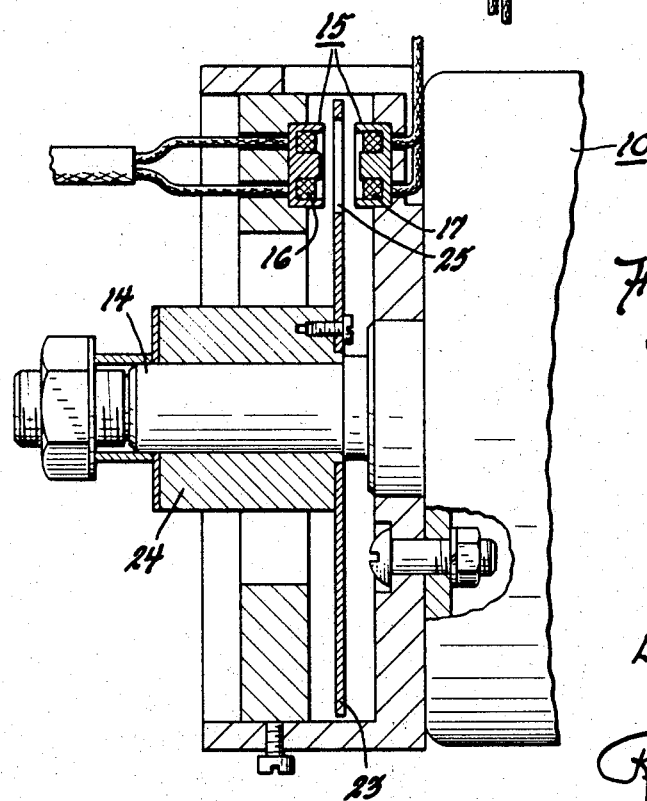
Figure 6:
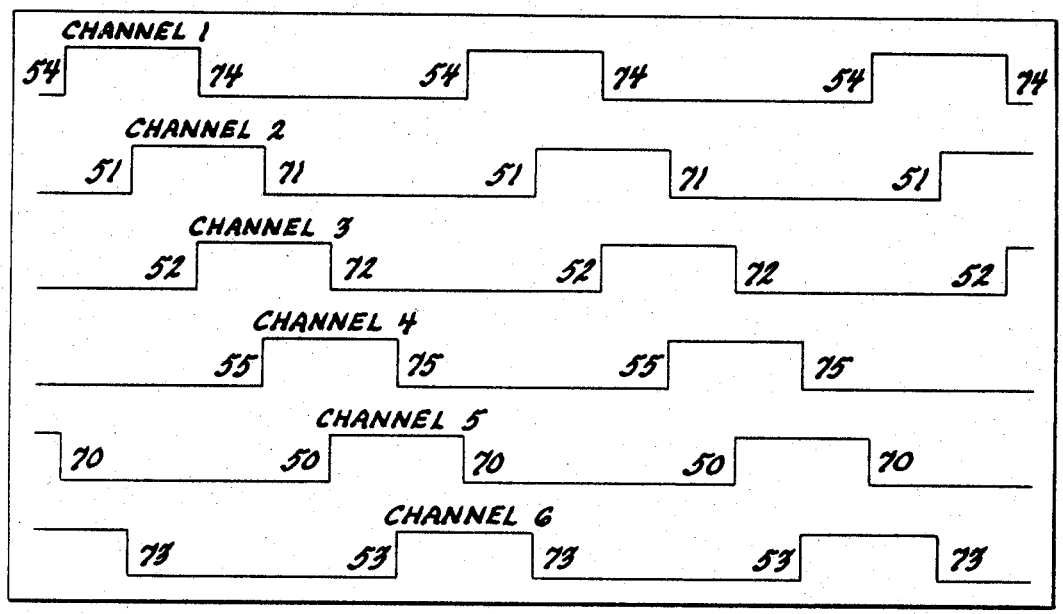
Figure 7:
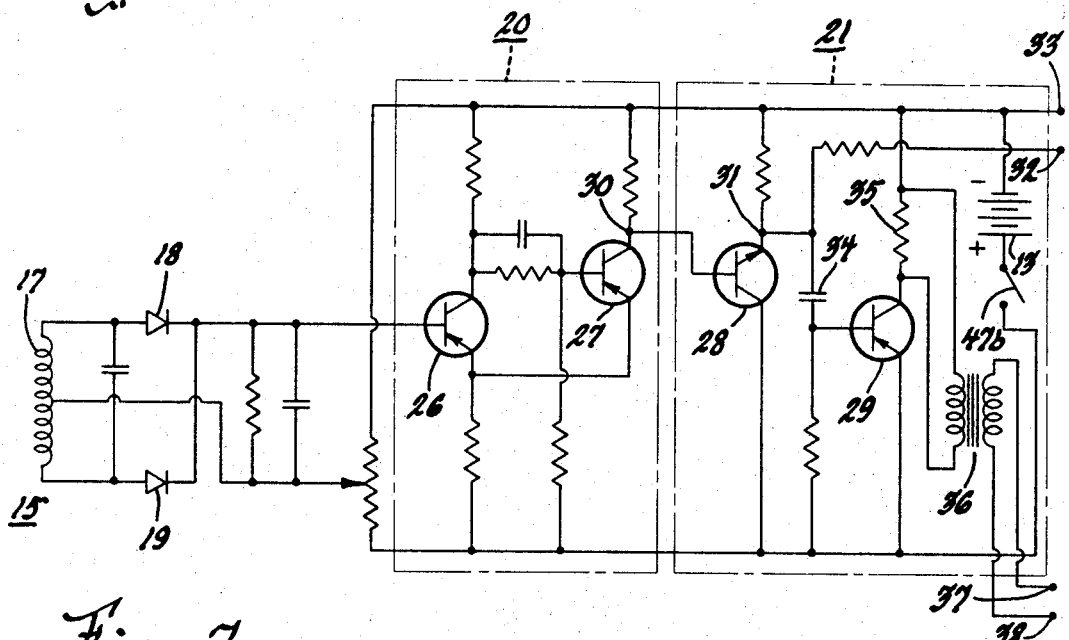

For a better understanding of the present invention, reference is made to the following description and accompanying drawings in which:

FIGURE 1 is a block diagram of a typical brushless motor system,

FIGURE 2 sets forth the triggering system of FIGURE 1 partially in schematic and partially in block form, FIGURE 3 is a schematic diagram of the novel commutation system of this invention, FIGURE 4 is an end view, partially cut away, of a motor shaft position sensing arrangement, FIGURE 5 is a fragmentary side view, partially in section, of FIGURE 4, FIGURE 6 is a set of curves helpful in understanding the features of this invention, and FIGURE 7 sets forth, in schematic form, circuit details of a square wave generator, pulse amplifier and input coupling circuitry, which may be used with the trigger system of FIGURE 2.

As is well known in the art, the armature of a direct current motor is rotated by the force produced by two interacting fields of magnetic flux which are produced by current flow through the field coils and the armature coils. In conventional machines, the magnetic poles resulting from current flow through the field coils are stationary and the magnetic poles produced by current flow through the armature coils tend to pull into alignment with the field magnetic poles. However, as the armature magnetic poles produced by current flow through any armature coil approaches alignment with the field magnetic poles, the commutator and brushes switch armature current from that coil to the next succeeding coil and the armature magnetic poles thereby produced tend to pull into alignment with the field poles. If this switching action by the commutator and brushes is performed at the proper shaft position, the armature will be rotated by the force produced as the armature poles of successive armature coils tend to pull into alignment with the field poles.

Armature or rotor rotation may also be produced by effectively rotating the magnetic poles produced by current flow through the field coils which tend to pull the poles produced by current flow through the armature coils therealong. This essentially rotating magnetic field may be produced by successively energizing the stator windings of a polyphase alternating current motor at the proper shaft positions from a direct current potential source.

Referring to the drawings, throughout the several figures of which like elements have been given like characters of reference, FIGURE 1 sets forth, in block form, a diagram of a typical brushless electrical motor system. The motor 10 may be any polyphase alternating current motor, however, the features of this invention will be described in reference to a three-phase, alternating current motor with Y connected stator coils.

The triggering system relates the switching action of the commutation system to shaft position as does the commutator in a conventional direct current motor.

The commutation system 12 performs the function of the commutator and brushes of a direct current motor. The commutation system, which is the subject of this invention, is schematically set forth in FIGURE 3 and will be explained in detail later in this specification.

As the commutation system energizes the stator coils of motor 10 with direct current power, a source of direct current potential 13 is shown to be connected to the commutation system. This source of direct current power may be a conventional storage battery or batteries.

Triggering system 11 produces electrical signal pulses which operate controllable commutating switching devices, included in commutation system 12, to close and complete an energizing circuit from direct current power source 13 to the corresponding stator coils in motor 10, in a manner to be later explained. As the commutation system performs the function of the commutator and brushes of a direct current motor, the switcing action must occur at the proper shaft position to produce rotor rotation. Therefore, the electrical signal pulses produced by triggering system 11 must be related to the position of shaft 14 of motor 10. Velocity type sensing elements are not suitable for this application since shaft position information must be available under stall as well as rotating conditions.

Without intention or inference of a limtation thereto, one method of producing the necessary signal pulses under stall as well as rotating conditions is to position a plurality of radio frequency transformers, each of which corresponds to a shaft position, about the periphery of the motor, energize the primary windings of all of these radio frequency transformers in parallel by a radio frequency oscillator and interrupt the magnetic coupling between the primary and secondary windings of all of the radio frequency transformers except the one corresponding to the shaft position at which an electrical signal is to be produced.

To interrupt the magnetic coupling between the primary and secondary windings of all of the radio frequency transformers except the necessary one, a disc of metallic material, such as aluminum, having properly spaced cut-out portions about the periphery may be positioned between the primary and secondary windings of all of the radio frequency transformers and rotated by the motor shaft.

The cut-out portions, when they pass between the primary and secondary windings of any of the radio frequency transformers, permit radio frequency energy to be magnetically coupled therebetween. These bursts of magnetically coupled radio frequency energy are present only during the time a cut-out is passing between primary and secondary windings and are rectified to produce a direct current pulse the width, in radians, of which is proportional to the width of the cut-out. This pulse may be used to operate a conventional square wave generator, such as a Schmitt trigger, which produces the switching signal pulses which are necessary to operate the commutation system. These switching pulses may be amplified in a conventional pulse amplifier and directed to the proper switching devices in commutation system 12.

To simulate a rotating magnetic field in the direct current energized stator of motor 10, it is necessary to provide at least two controllable switches for each phase winding so that direct current may be selectively passed therethrough in either direction. As the novel commutating circuit of this invention will be explained in regard to a three-phase Y connected machine, a total of six controllable commutating switches and, therefore, six switching channels and six radio frequency transformers are required.

Triggering system 11 is set forth in FIGURE 2 partially in schematic and partially in block form. Each switching channel includes a radio frequency transformer 15 having a primary winding 16 and a secondary winding 17, a pair of diodes 18 and 19 to full-wave rectify the secondary winding 17 output, a square wave generator 20 and a pulse amplifier 21. As each switching channel includes identical respective components, corresponding components of all channels have been referenced by the same numeral.

The primary winding 16 of all six radio frequency transformers 15 are energized in parallel by a radio frequency oscillator 22 which may be any conventional radio frequency oscillator well known in the art and, therefore, has been shown in FIGURE 2 in block form. In a practical application of this triggering system, oscillator 22 had a natural frequency of 170 kilocycles.

The disc of metallic material located between the primary and secondary windings of all of the radio frequency transformers 15 is schematically represented in FIGURE 2 by dashed line 23 which is shown to be operably connected to output shaft 14 of motor 10.

FIGURES 4 and 5 illustrate the mechanical details of one method of mounting radio frequency transformers 15 about the periphery of motor 10 and providing for the interruption of the magnetic coupling between the respective primary and secondary windings thereof. The primary and secondary windings of each transformer may be wound about respective core members of magnetic material having an E cross section which are axially spaced from each other as in shown in FIGURE 5. Disc member 23 is located between the primary and secondary windings of all of the radio frequency transformers 15 and is rotated by the shaft 14 of motor 10. Disc 23 may be secured to hub member 24, which is rotated with shaft 14, by screws or other suitable fastening means.

The number of cut-out portions required in disc 23 is equal to the number of pole pairs in the motor with which this system is to be used. Assuming motor 10 to have seven pole pairs, seven cut-out portions, referenced 25a through 25g in FIGURE 4, are located about the periphery of disc 23 and are spaced in such a manner that at least a partial magnetic coupling is established between the primary and secondary windings of at least two of the radio frequency transformers 15 at all times.

In FIGURE 4, cut-out portion 25a is axially aligned with the primary and secondary windings of radio frequency transformer 15a and cut-out portions 25b and 25g are in partial axial alignment with the primary and secondary windings of radio frequency transformers 15b and 15f, respectively. Assuming that shaft 14 is revolving in a clockwise direction, as looking at FIGURE 4, full magnetic coupling between the primary and secondary windings of radio frequency transformer 15b will be established after a few degrees of rotation when cut-out portion 25b is in axial alignment therewith.

Should the shaft 14 of motor 10 be revolving in a counter-clockwise direction, a full magnetic coupling between the primary and secondary windings of radio frequency transformer 15f will be established after a few degrees of rotation as cut-out portion 25g comes into axial alignment therewith. With shaft 14 rotating in either direction, therefore, full magnetic coupling between the primary and secondary windings of successive radio frequency transformers 15 is established. With this arrangement, there is always a switching signal source under stall conditions which is followed by successive discrete switching signals as the shaft 14 of motor 10 rotates.

FIGURE 7 sets forth, in schematic form, circuit details of a square wave generator 20, an amplifier 21, and the external circuitry which may be employed for coupling square wave generator 20 to the secondary winding 17 of each of the radio frequency transformers 15. This circuitry is suitable for use as the square wave generator and amplifier in each of the switching channels schematically shown in block form in FIGURE 2 and referenced by the numerals 20 and 21, respectively.

Referring to FIGURE 7, transistors 26 and 27 and their associated interconnecting circuitry comprise a conventional Schmitt trigger circuit. Circuits of this type are well known and are characterized by the ability to operate in one stable state with no potential applied to the input electrodes of the first transistor 26 and will revert to an alternate stable state when a sufficient potential is applied to the input electrodes of transistors 26.

Transistors 28 and 29 and their associated interconnecting circuitry comprise a two output amplifier circuit which provides an initial positive going output pulse which is followed by a second positive going output pulse when the initial output pulse returns to zero.

With no signal present upon secondary winding 17 and, consequently, no potential applied across the input terminals of transistor 26, transistor 26 is conducting and transistors 27, 28 and 29 are not conducting. Should one of the cut-out portions 25 about the periphery of disc 23 establish the magnetic coupling between secondary winding 17 and its associated primary winding 16, a high frequency alternating current potential is induced in secondary winding 17 which is full wave rectified by diodes 18 and 19 and applied as a positive polarity potential across the base-emitter electrodes of type PNP transistor 26. As the presence of a potential upon the base electrode of a type PNP transistor which is of a polarity more positive than that applied to the emitter electrode will not permit emitter-base current flow through a type PNP transistor, transistor 26 is extinguished and transistor 27 is triggered to conduction through the well known Schmitt trigger circuit action. With transistor 27 conducting, the potential at junction 30, which is applied to the base electrode of type NPN transistor 28, goes positive. As this condition satisfies the base-emitter bias requirements for base-emitter current flow through a type NPN transistor, transistor 28 conducts. As transistor 28 conducts, the potential at junction 31 goes positive and a commutating switching signal pulse appears across commutating output terminals 32 and 33 which is of a positive polarity on terminal 32. As transistor 28 conducts, capacitor 34 discharges through the collector-emitter circuit thereof and holds transistor 29 extinguished.

As the cut-out 25 about the periphery of disc 23 moves out of axial alignment with secondary winding 17 and its associated primary winding, the magnetic coupling therebetween is interrupted by the solid portion of disc 23 and the positive polarity potential is removed from the base electrode of transistor 26. Upon the removal of this potential from the base of transistor 26, this device again conducts and transistor 27 extinguishes through the well known Schmitt trigger circuitry action. As transistor 27 extinguishes, substantially equal potential is applied across the base-emitter electrodes of type NPN transistor 28 which extinguishes this transistor device and removes the positive polarity pulse from commutating output terminals 32 and 33. With transistor 28 extinguished, battery potential appears across capacitor 34 and the emitter-base junction of transistor 29. Capacitor 34 charges through the emitter-base junction of transistor 29 thereby supplying base current through type PNP transistor 29. Therefore, this device conducts until capacitor 34 becomes charged.

As transistor 29 conducts, a current flows through resistor 35 and the primary winding of transformer 36 which induces a potential pulse in the secondary winding of transformer 36. This induced pulse appears as an extinguishing switching signal pulse across the extinguishing output terminals 37 and 38. For purposes of this specification, it will be assumed that transformer 36 is so poled that this signal pulse is of a positive polarity at output terminal 37.

When capacitor 34 has become charged, the potential upon the base of transistor 29 is of a positive polarity, a condition which does not satisfy the base-emitter bias requirement for emitter-base current flow through a type PNP transistor, therefore, this device is extinguished and the potential pulse is removed from extinguishing output terminals 37 and 38. At this time, this circuitry has returned to its initial normal state and is prepared to produce a commutating switching signal pulse followed by an extinguishing switching signal pulse the next time magnetic coupling is established between a secondary winding 17 and its associated primary winding. The width of the positive polarity commutating switching signal pulse which appears across commutating output terminals 32 and 33 is determined by the period of time that magnetic coupling is established between a secondary winding 17 and its associated primary winding.

In the novel commutation system which is to be described later in this specification, the controllable commutating switching devices are extinguished by the application thereacross of a reverse polarity potential. To do this, a corresponding controllable extinguishing switching device is required. Therefore, each amplifier 21 must produce switching signals for both the corresponding controllable commutating switching device and the corresponding controllable extinguishing switching device. These switching pulses appear across commutating output terminals 32 and 33 and extinguishing output terminals 37 and 38, respectively, in the manner just described.

The trigger system forms no part of this invention, however, the foregoing description has been included in this specification for the purpose of indicating one acceptable method for providing, at the proper times, the switching signals which are required for the operation of the novel commutation system schematically set forth in FIGURE 3, which is the subject of this invention. For this reason, the description of the trigger system has deliberately been made brief.

Referring to FIGURE 3, the novel commutation system of this invention is set forth in schematic form. Direct current power may be supplied by a conventional storage type battery 13 which may be connected across the positive polarity input circuit line 45 and the negative polarity input circuit line 46, as indicated. The novel commutation system of this invention does not require the direct current power source to be a battery, as it will function satisfactorily with rectified alternating current power.

The stator coils 6, 7 and 8 of motor 10 are schematically set forth in FIGURE 3. Although stator coils 6, 7 and 8 have been indicated in FIGURE 3 to be connected in a Y configuration, it is to be specifically understood that the novel commutation system of this invention is equally applicable to stator coils connected in a delta configuration. The coils 6, 7 and 8 of FIGURE 3 are not to be construed as single coils but as a schematic representation of all coils included in the respective phases. Throughout the specification, the ends of coils 6, 7 and 8 which are not connected to the electrical neutral point N will be referred to as the terminal ends.

To properly energize coils 6, 7 and 8, a bridge type commutating switching circuit including a plurality of series connected pairs of controllable commutating switching devices, each having at least two current carrying electrodes and a control electrode and being of the type which may be extinguished upon the application of an electrical charge in a reverse polarity relationship across the current carrying electrodes thereof, is povided.

In FIGURE 3, these controllable commutating switching devices have been shown to be silicon controlled rectifiers 50, 51, 52, 53, 54 and 55.

The silicon controlled rectifier is a semiconductor device having a control electrode, generally termed the gate electrode, and two current carrying electrodes, generally referred to as the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. In the conducting state, therefore, the silicon controlled rectifier functions as a conventional diode. Upon being triggered to conduction, however, the control electrode is no longer capable of affecting the device, which will remain in the conducting state until either the anode-cathode circuit is interrupted or the polarity of the potential applied across the anode-cathode electrodes is reversed. Of these two alternatives, the reversal of the polarity of the potential across the anode-cathode electrodes thereof is perhaps the most satisfactory.

In the novel extinguishing circuit of this invention, the reverse polarity potential is supplied by discharging electrical charge storage devices in a manner to be later explained.

As this specification will describe the operation of the novel commutating circuit of this invention as used with a three phase alternating current machine, and since current must be passed in both directions through the phase winding to produce the required effectively rotating magnetic field, it is necessary to provide two commutating switching devices for each phase winding. With a three phase machine, therefore, a total of six commutating switching devices is required. With alternating current machines of more or less phases, correspondingly more or less commutating switching devices may be required.

The bridge type commutating switching circuit includes three series connected pairs of silicon controlled rectifier commutating switches which are connected in parallel across input circuit lines 45 and 46 with the anode electrode of one of the silicon controlled rectifiers of each series connected pair being connected to the positive polarity input line 45 and the cathode electrode of the other silicon controlled rectifier of each series connected pair being connected to negative polarity input line 46. That is, the anode electrodes of silicon controlled rectifiers 50, 52 and 54 are connected to positive polarity input line 45 and the cathode electrodes of silicon controlled rectifiers 51, 53 and 55 are connected to the negative polarity input line 46.

Corresponding to each one of the silicon controlled rectifier commutating switches of the bridge type commutating switching circuit is an electrical charge storage device in which an electrical charge may be stored and which may be used to extinguish the corresponding silicon controlled rectifier commutating switch. These electrical charge storage devices have been shown in FIGURE 3 as capacitors 60, 61, 62, 63, 64 and 65 which correspond to respective silicon controlled rectifier commutating switches 50, 51, 52, 53, 54 and 55 of the commutating switching circuit.

These electrical charge storage devices are interconnected with the commutating switching circuit in such a manner that each may receive an electrical charge. The precise charging circuits for each capacitor will be described in detail later in this specification.

So that each silicon controlled rectifier commutating switch may be selectively extinguished by the application of the electrical charge stored in the corresponding electrical charge storage device in a reverse polarity relationship across the current carrying electrodes thereof, provision is made for selectively applying the charge stored in each capacitor across the anode-cathode electrodes of the corresponding silicon controlled rectifier commutating switch of the commutating switching circuit. To complete a discharge circuit for each capacitor across the anode-cathode electrodes of the corresponding silicon controlled rectifier commutating switch, there is provided a controllable extinguishing switching device of the type having at least two current carrying electrodes and a control electrode and being of the type which, when forward poled, may be triggered to conduction upon the application of a proper polarity signal pulse to the control electrode thereof corresponding to each silicon controlled rectifier commutating switch.

These controllable extinguishing switching devices are indicated in FIGURE 3 as silicon controlled rectifier extinguishing switches 70, 71, 72, 73, 74 and 75 which correspond to respective silicon controlled rectifier commutating switches 50, 51, 52, 53, 54 and 55.

The commutating switches and the extinguishing switches have been indicated in FIGURE 3 to be silicon controlled rectifier. It is to be specifically understood, that alternate switching devices having similar electrical characteristics and ratings may be substituted therefor without departing from the spirit of the invention.

Corresponding to each series connected pair of silicon controlled rectifier commutating switches is the series combination of a silicon controlled rectifier extinguishing switch, two capacitors and another silicon controlled rectifier extinguishing switch. The series combination of silicon controlled rectifier extinguishing switch 70, capacitors 60 and 61 and silicon controlled rectifier extinguishing switch 71 corresponds to the series connected pair of silicon controlled rectifier commutating switches 50 and 51, the series combination of silicon controlled rectifier extinguishing switch 72, capacitors 62 and 63 and silicon controlled rectifier extinguishing switch 73 corresponds to the series connected pair of silicon controlled rectifier commutating switches 52 and 53 and the series combination of silicon controlled rectifier extinguishing switch 74, capacitors 64 and 65 and silicon controlled rectifier extinguishing switch 75 correspond to the series connected pair of silicon controlled rectifier commutating switches 54 and 55.

Connected across each combination of two series capacitors is the series combination of two charging resistors. Resistors 80 and 81 are connected in series across series connected capacitors 60 and 61, resistors 82 and 83 are connected in series across series connected capacitors 62 and 63 and resistors 84 and 85 are connected in series across series connected capacitors 64 and 65. The junction 76 between resistors 80 and 81, the junction 77 between resistors 82 and 83 and the junction 78 between resistors 84 and 85 are electrically interconnected by lead 79.

The junction 56 between capacitors 60 and 61 is connected to the terminal end of phase winding 7 of the alternating current induction motor 10, junction 57 between capacitors 62 and 63 is connected to the terminal end of phase winding 8 and junction 58 between capacitors 64 and 65 is connected to the terminal end of phase winding 6.

Junction 56 between capacitors 60 and 61 is also connected to the junction between the series connected pair of silicon controlled rectifier commutating switches 50 and 51, junction 57 between capacitors 62 and 63 is also connected to the junction between the series connected pair of silicon controlled rectifier commutating switches 52 and 53 and junction 58 between capacitors 64 and 65 is also connected to the junction between the series connected pair of silicon controlled rectifier commutating switches 54 and 55.

The control electrode of each of the silicon controlled rectifier commutating switches is connected to the positive polarity output terminal 32 and the cathode electrode of each of the silicon controlled rectifier commutating switches is connected to the negative polarity output terminal 33 of the corresponding amplifier 21 schematically set forth in FIGURES 2 and detailed in FIGURE 7. That is, the control-cathode electrodes of silicon controlled rectifier commutating switches 50, 51, 52, 53, 54 and 55 are connected across the commutating output terminals corresponding to output terminals 32 and 33, respectively, of FIGURE 7, of respective amplifiers 5, 2, 3, 6, 1 and 4 of FIGURE 2. In FIGURES 2 and 3, these connections are so labeled.

With transistor 28 of FIGURE 7 in its normal state of non-conduction, there is substantially no potential across commutating output terminals 32 and 33. With transistor 28 conducting, a potential pulse, which is of a positive polarity at commutating output terminal 32, appears across commutating output terminals 32 and 33 and is, therefore, applied across the control-cathode electrode of the corresponding silicon controlled rectifier commutating switch. As this is the proper control-cathode electrode potential relationship to produce control-cathode electrode gate current flow through a silicon controlled rectifier, gating current flows through the corresponding silicon controlled rectifier device through a circuit which may be traced from the positive polarity terminal of the potential source of FIGURE 7 through conducting transistor 28, positive polarity commutating terminal 32, the control-cathode electrode of the corresponding silicon controlled rectifier and commutating terminal 33 to the negative polarity terminal of the potential source of FIGURE 7. This gate current will trigger the corresponding silicon controlled rectifier switch to conduction when it is forward poled.

The control electrode of each of the silicon controlled rectifier extinguishing switching devices is connected to the positive polarity extinguishing terminal 37 and the cathode electrode of each of the silicon controlled rectifier extinguishing switching devices is connected to the negative polarity extinguishing terminal 38 of the corresponding amplifier 21 schematically set forth in FIGURE 7. That is, the control-cathode electrodes of extinguishing silicon controlled rectifiers 70, 71, 72, 73, 74 and 75 are connected across the terminals corresponding to extinguishing terminals 37 and 38, respectively, of FIGURE 7 of respective pulse amplifiers 5, 2, 3, 6, 1 and 4 of FIGURE 2. In FIGURES 2 and 3, these connections are so labeled.

As transistor device 29 of FIGURE 7 is triggered to conduction as transistor 28 goes non-conducting, in a manner previously described, a pulse is induced from the primary to the secondary winding of transformer 36. The secondary winding of transformer 36 is so poled that, with transistor 29 conducting, the potential at extinguishing terminal 37 is of a positive polarity in respect to that at extinguishing terminal 38. As the control electrode of the corresponding silicon controlled rectifier extinguishing switch is connected to extinguishing terminal 37 and the cathode electrode of the same silicon controlled rectifier extinguishing siwtch is connected to extinguishing terminal 38, this signal pulse produces gate current through the corresponding silicon controlled rectifier extinguishing switch and will trigger this device to conduction when it is forward poled.

FIGURE 6 represents the sequence and time relationships of the commutating switch signal potentials which appear across the commutating terminals corresponding to commutating terminals 32 and 33 of FIGURE 7 of each of the respective amplifiers 21 of FIGURE 2 as the shaft 14 of motor 10 rotates and the magnetic coupling between the primary and secondary windings of successive radio frequency transformers is established by the cut-out portion of disc 23. As has previously been described, the corresponding silicon controlled rectifier commutating switch is triggered to conduction upon the rise of each commutating switch signal which appears across the commutating terminals corresponding to commutating terminals 32 and 33 and the corresponding silicon controlled rectifier extinguishing switch is triggered to conduction by the extinguishing switch signal which appears across the extinguishing terminals corresponding to extinguishing terminals 37 and 38 of FIGURE 7 of each of the respective amplifiers 21 upon the fall of each commutating switch signal. Therefore, the rise of each commutating switch signal of each channel is labeled by the numeral which references the corresponding silicon controlled rectifier commutating switch and the fall of each commutating switch signal of each channel is labeled by the numeral which references the corresponding silicon controlled rectifier extinguishing switch.

As the action of the commutatnig switch signals and the extinguishing switch signals to trigger the corresponding silicon controlled rectifier switching devices to conduction has been hereinbefore described in detail, in the following description of the operation of the novel commutating circuit of this invention, it will only be stated that the presence of these signals in any channel triggers the corresponding silicon controlled rectifier switching device to conduction.

Assuming that the system is unenergized and that the position of disc 23 relative to the six radio frequency transformers is as shown in FIGURE 4, cut-out portion 25a is in axial alignment with the primary and secondary windings of radio frequency transformer 15a and cut-out portions 25b and 25g are in partial axial alignment with the primary and secondary windings of radio frequency transformers 15b and 15f, respectively.

Upon the closure of switch 47, which may be any conventional two pole, single throw, maintained contact switch, positive polarity input line 45 and negative polarity input line 46 are energized by battery 13 through closed contact 47a of switch 47 and power is supplied to the amplifier circuitry of FIGURE 7 through closed contact 47b of switch 47.

Although silicon controlled rectifiers are characterized by the ability to block current flow in either direction when in the non-conducting state, it has been found that these devices are not ideal, but that a small leakage current is conducted therethrough while in the non-conducting or blocking state with the anode-cathode electrodes forward poled. As the anode-cathode electrodes of all of the silicon controlled rectifier commutating switches of the commutating switching circuit are connected to respective positive and negative potential lines 45 and 46 and since these devices are not ideal, each appears electrically as a high value resistance which conducts a small current. Therefore, a portion of the direct current potential appearing across input lines 45 and 46 is dropped across each commutating silicon controlled rectifier, a condition which forward poles each one of these devices.

The burst of radio frequency energy magnetically coupled between the primary and secondary windings of radio frequency transformer 15a of FIGURE 4 is rectified and applied to square wave generator 1 which produces a commutating switching signal across commutating terminals 32 and 33 of amplifier 1 of channel 1 which triggers silicon controlled rectifier commutating switch 54 to conduction.

As the magnetic coupling between the primary and secondary windings of radio frequency transformers 15b and 15f is partially established by respective cut-out portions 25b and 25g, a commutating switch signal also appears across the commutating terminals 32 and 33 of the pulse amplifiers 21 corresponding to channels 2 and 6, respectively, which triggers silicon controlled rectifier commutating switches 51 and 53, respectively, to conduction.

Capacitors 64–65, 62–63 and 60–61 are charged through a charging circuit which may be traced from positive polarity input line 45 and conducting silicon controlled rectifier 54, through junction 58 between capacitors 64 and 65, through capacitors 64 and 65 in parallel, charging resistors 84 and 85 in parallel, through lead 79 to junction 77, through charging resistors 82 and 83 in parallel, capacitors 62 and 63 in parallel to junction 57 and through conducting silicon controlled rectifier 53 to the negative polarity input line 46 and also through lead 79 to junction 76, through charging resistors 80 and 81 in parallel, capacitors 60 and 61 in parallel to junction 56 and through conducting silicon controlled rectifier 51 to the negative polarity input line 46. This charge places a positive polarity potential upon junction 58 and a negative polarity potential upon respective junctions 57 and 56.

Conducting silicon controlled rectifier commutating switches 54, 51 and 53 energize motor winding 6 and windings 7 and 8 in parallel. Therefore, motor 10 begins to rotate and continues to rotate as long as the system remains energized.

After a few degrees of rotation, the magnetic coupling between the primary and secondary windings of radio frequency transformer 15f is interrupted, the commutating switch signal appearing across commutating terminals 32 and 33 of the amplifier 21 corresponding to channel 6 falls and poduces an extinguishing switch signal across extinguishing terminals 37 and 38 of the same amplifier in a manner previously described.

This extinguishing switch signal is applied across the control-cathode electrodes of silicon controlled rectifier extinguishing switch 73, which is forward poled by the charge on capacitor 63 which is of a negative polarity at junction 57, and triggers this device to conduction. With silicon controlled rectifier extinguishing switch 73 conducting, the charge on capacitor 63, which is of a negative polarity on the plate connected to the anode electrode of silicon controlled rectifier commutating switch 53, is applied in a reverse polarity relationship across the anode and cathode electrodes thereof and quickly extinguishes this device.

At this time, only silicon controlled rectifier commutating switches 51 and 54 are conducting and windings 6 and 7 of motor 10 are energized.

The collapsing magnetic field of winding 8, as silicon controlled rectifier commutating switch 53 is extinguished, induces a potential across windings 8 and 7 which is of a positive polarity at the terminal end of winding 8 and charges the plates of capacitors 62 and 63 connected to junction 57 positive. With a positive potential present at junction 57, the plate of capacitor 63, connected to the anode electrode of silicon controlled rectifier extinguishing switch 73, is of a negative polarity which reverse biases this device and, therefore, extinguishes it.

The magnetic coupling between the primary and secondary windings of radio frequency transformer 15c is next established as cut-out portion 25c moves into axial alignment with the primary and secondary windings thereof and the magnetic coupling between the primary and secondary windings of radio frequency transformer 15a is interrupted as cut-out portion 25a moves out of axial alignment with the primary and secondary windings thereof. This condition produces a commutating switch signal across the commutating terminals of the amplifier 21 corresponding to channel 3, which triggers silicon controlled rectifier commutating switch 52 to conduction, and an extinguishing switch signal across the extinguishing terminals of the amplifier 21 corresponding to channel 1. As silicon controlled rectifier extinguishing switch 74 is forward poled by the charge on capacitor 64, which is of a positive polarity at junction 58, this extinguishing switch signal triggers silicon controlled rectifier extinguishing switch 74 to conduction. With silicon controlled rectifier extinguishing switch 74 conducting, the charge on capacitor 64, which is of a positive polarity on the plate connected to the cathode electrode of silicon controlled rectifier commutating switch 54 is applied in a reverse polarity relationship across the anode and cathode electrodes thereof and quickly extinguishes this device. Therefore, the energizing circuit for motor winding 6 is interrupted by extinguished silicon controlled rectifier commutating switch 54 and an energizing circuit is established for motor windings 8 and 7 through conducting silicon controlled rectifier commutating switches 52 and 51, which remains conducting. The resulting collapsing magnetic field of winding 6 induces a potential across motor windings 8 and 6 which is of a negative polarity at the terminal end of winding 6. This induced potential charges the plates of capacitors 64 and 65 connected to junction 58 negative, thereby extinguishing silicon controlled rectifier 74.

The magnetic coupling between the primary and secondary windings of radio frequency transformer 15d is next established as cut-out portion 25d moves into axial alignment with the primary and secondary windings thereof and the magnetic coupling between the primary and secondary windings of radio frequency transformer 15b is interrupted as cut-out portion 25b moves out of axial alignment with the primary and secondary windings thereof. This condition produces a commutating switch signal across the commutating terminals of the amplifier 21 corresponding to channel 4, which triggers silicon controlled rectifier commutating switch 55 to conduction, and an extinguishing switch signal across the extinguishing terminals of the amplifier 21 corresponding to channel 2. As silicon controlled rectifier extinguishing switch 71 is forward poled by the charge on capacitor 61, which is of a negative polarity at junction 56, this extinguishing switch signal triggers silicon controlled rectifier extinguishing switch 71 to conduction. With silicon controlled rectifier extinguishing switch 71 conducting, the charge on capacitor 61, which is of a negative polarity on the plate connected to the anode electrode of silicon controlled rectifier commutating switch 51, is applied in a reverse polarity relationship across the anode and cathode electrodes thereof and quickly extinguishes this device. Therefore, the energizing circuit for motor winding 7 is interrupted by extinguished silicon controlled rectifier commutating switch 51 and an energizing circuit is established for motor windings 8 and 6 through conducting silicon controlled rectifier commutating switches 55 and 52, which remains conducting. The resulting collapsing magnetic field of winding 7 induces a potential across motor windings 7 and 6 which is of a positive polarity at the terminal end of winding 7. This induced potential charges the plates of capacitors 60 and 61 connected to junction 56 positive, thereby extinguishing silicon controlled rectifier 71.

The magnetic coupling between the primary and secondary windings of radio frequency transformer 15e is next established as cut-out portion 25e moves into axial alignment with the primary and secondary windings thereof and the magnetic coupling between the primary and secondary windings of radio frequency transformer 15c is interrupted as cut-out portion 25c moves out of axial alignment with the primary and secondary windings thereof. This condition produces a commutating switch signal across the commutating terminals of the amplifier 21 corresponding to channel 5, which triggers silicon controlled rectifier commutating switch 50 to conduction, and an extinguishing switch signal across the extinguishing terminals of the amplifier 21 corresponding to channel 3. As silicon controlled rectifier extinguishing switch 72 is forward poled by the charge on capacitor 62, which is of a positive polarity at junction 57, this extinguishing switch signal triggers silicon controlled rectifier extinguishing switch 72 to conduction. With silicon controlled rectifier extinguishing switch 72 conducting, the charge on capacitor 62, which is of a positive polarity on the plate connected to the cathode electrode of silicon controlled rectifier commutating switch 52, is applied in a reverse polarity relationship across the anode and cathode electrodes thereof, and quickly extinguishes this device. Therefore, the energizing circuit for motor winding 8 is interrupted by extinguished silicon controlled rectifier commutating switch 52 and an energizing circuit is established for motor windings 7 and 6 through conducting silicon controlled rectifier commutating switches 50 and 55, which remains conducting. The resulting collapsing magnetic field of winding 8 induces a potential across motor windings 7 and 8 which is of a negative polarity at the terminal end of winding 8. This induced potential charges the plates of capacitors 62 and 63 connected to junction 57 negative, thereby extinguishing silicon controlled rectifier 72.

The magnetic coupling between the primary and secondary windings of radio frequency transformer 15f is next established as cut-out portion 25f moves into axial alignment with the primary and secondary windings thereof and the magnetic coupling between the primary and secondary windings of radio frequency transformer 15d is interrupted as cut-out portion 25d moves out of axial alignment with the primary and secondary windings thereof. This condition produces a commutating switch signal across the commutating terminals of the amplifier 21 corresponding to channel 6, with triggers silicon controlled rectifier commutating switch 53 to conduction, and an extinguishing switch signal appears across the extinguishing terminals of the amplifier 21 corresponding to channel 4. As silicon controlled rectifier extinguishing switch 75 is forward poled by the charge on capacitor 65, which is of a negative polarity at junction 58, this extinguishing switch signal triggers silicon controlled rectifier extinguishing switch 75 to conduction. With silicon controlled rectifier extinguishing switch 75 conducting, the charge upon capacitor 65, which is of a negative polarity on the plate connected to the anode electrode of silicon controlled rectifier commutating switch 55, is applied in a reverse polarity relationship across the anode and cathode electrodes thereof and quickly extinguishes this device. Therefore, the energizing circuit for motor winding 6 is interrupted by extinguished silicon controlled rectifier commutating switch 55 and an energizing circuit is established for motor windings 7and 8 through conducting silicon controlled rectifier commutating switches 53 and 50, which remains conducting. The resulting collapsing magnetic field of winding 6 induces a potential across motor windings 6 and 8 which is of a positive polarity at the terminal end of winding 6. This induced potential charges the plates of capacitors 64 and 65 connected to junction 58 positive, thereby extinguishing silicon controlled rectifier 75.

The magnetic coupling between the primary and secondary windings of radio frequency transformer 15a is next established as cut-out portion 25g moves into axial alignment with the primary and secondary windings thereof and the magnetic coupling between the primary and secondary windings of radio frequency transformer 15e is interrupted as cut-out portion 25e moves out of axial alignment with the primary and secondary windings thereof. This condition produces a commutating switch signal across the commutating terminals of the amplifier 21 corresponding to channel 1, which triggers silicon controlled rectifier 54 to conduction, commutating switch and an extinguishing switch signal appears across the extinguishing terminals of the amplifier 21 corresponding to channel 5. As silicon controlled rectifier extinguishing switch 70 is forward poled by the charge on capacitor 60, which is of a positive polarity at junction 56, this extinguishing switch signal triggers silicon controlled rectifier extinguishing switch 70 to conduction. With silicon controlled rectifier extinguishing switch 70 conducting, the charge on capacitor 60, which is of a positive polarity on the plate connected to the cathode electrode of silicon controlled rectifier commutating switch 50, is applied in a reverse polarity relationship across the anode and cathode electrodes thereof and quickly extinguishes this device. Therefore, the energizing circuit for motor winding 7 is interrupted by extinguished silicon controlled rectifier commutating switch 50 and an energizing circuit is established for motor windings 6 and 8 through conducting silicon controlled rectifier commutating switches 54 and 53, which remains conducting. The resulting collapsing magnetic field of winding 7 induces a potential across motor windings 6 and 7 which is of a negative polarity at the terminal end of winding 7. This induced potential charges the plates of capacitors 60 and 61 connected to junction 56 negative, thereby extinguishing silicon controlled rectifier 70.

The magnetic coupling between the primary and secondary windings of radio frequency transformer 15b is next established as cut-out portion 25a moves into axial alignment with the primary and secondary windings thereof and the magnetic coupling between the primary and secondary windings of radio frequency transformer 15f is interrupted as cut-out portion 25f moves out of axial alignment with the primary and secondary windings thereof. This condition produces a commutating switch signal across the commutating terminals of the amplifier 21 corresponding to channel 2, which triggers silicon controlled rectifier commutating switch 51 to conduction, and an extinguishing switch signal appears across the extinguishing terminals of the amplifier 21 corresponding to channel 6. As silicon controlled rectifier extinguishing switch 73 is forward poled by the charge on capacitor 63, which is of a negative polarity at junction 57, this extinguishing switch signal triggers silicon controlled rectifier extinguishing switch 73 to conduction. With silicon controlled rectifier extinguishing switch 73 conducting, the charge on capacitor 63, which is of a negative polarity on the plate connected to the anode electrode of silicon controlled rectifier commutating switch 53, is applied in a reverse polarity relationship across the anode and cathode electrodes thereof and quickly extinguishes this device. Therefore, the energizing circuit for motor winding 8 is interrupted by extinguished silicon controlled rectifier commutating switch 53 and an energizing circuit is established for motor windings 6 and 7 through conducting silicon controlled rectifier commutating switches 51 and 54, which remains conducting. The resulting collapsing magnetic field of winding 8 induces a potential across motor windings 8 and 7 which is of a positive polarity at the end of winding 8. This induced potential charges the plates of capacitors 62 and 63 connected to junction 57 positive, thereby extinguishing silicon controlled rectifier 73.

From this description, it is apparent that the commutating switching system of this invention energizes the motor with an essentially rotating magnetic field and the extinguishing circuitry in combination therewith extinguishes each commutating switch at the proper time.

One advantage realized with an extinguishing switch circuit as described in this specification with two capacitor devices connected in series with two extinguishing switches is that the extinguishing switches will not become short circuited across the input circuit means.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A direct current commutation system for brushless type electrical motors comprising, positive and negative polarity input circuit means, a bridge type commutating switching circuit including a plurality of series connected pairs of silicon controlled rectifier commutating switches, means for connecting said series connected pairs of silicon controlled rectifier commutating switches in parallel across said input circuit means, an electrical charge storage means corresponding to each of said silicon controlled rectifier commutating switches for storing an electrical charge, a controllable extinguishing switching device having at least two current carrying electrodes and a control electrode and being of the type which when forward poled may be triggered to conduction upon the application of a proper polarity signal pulse to the control electrode thereof corresponding to each of said silicon controlled rectifier commutating switches, means for connecting the series combination of a first said controllable extinguishing switching device, a first said electrical charge storage means, a second said electrical charge storage means and a second said controllable extinguishing switching device corresponding to each of said series connected pairs of said silicon controlled rectifier commutating switches across said input circuit means, the series combination of two resistors connected across each combination of said first and second said electrical charge storage means, means for electrically interconnecting the junctions between said resistors of all of said series combination of two resistors and means for connecting the junction between each combination of said first and second electrical charge storage means to the junction between the said series connected pair of said silicon controlled rectifier commutating switches to which they correspond.

2. A direct current commutation system for brushless type electrical motors as described in claim 1 wherein said electrical charge storage means are capacitors.

3. A direct current commutation system for brushless type electrical motors comprising, positive and negative polarity input circuit means, a bridge type commutating switching circuit including a plurality of series connected pairs of silicon controlled rectifier commutating switches, means for connecting said series connected pairs of silicon controlled rectifier commutating switches in parallel across said input circuit means, an electrical charge storage means corresponding to each of said silicon controlled rectifier switches for storing an electrical charge, a silicon controlled rectifier extinguishing switch corresponding to each of said silicon controlled rectifier commutating switches, means for connecting the series combination of a first said silicon controlled rectifier extinguishing switch, a first said electrical charge storage means, a second said electrical charge storage means and a second said silicon controlled rectifier extinguishing switch corresponding to each of said series connected pairs of said silicon controlled rectifier commutating switches across said input circuit means, the series combination of two resistors connected across each combination of said first and second said electrical charge storage means, means for electrically interconnecting the junctions between said resistors of all of said series combination of two resistors and means for connecting the junction between each combination of said first and second electrical charge storage means to the junction between the said series connected pair of said silicon controlled rectifier commutating switches to which they correspond.

4. A direct current commutation system for brushless type electrical motors as described in claim 3 wherein said electrical charge storage means are capacitors.

5. In a direct current commutation system for brushless type electrical motors of the type having a bridge type commutating switching circuit including a plurality of series connected pairs of silicon controlled rectifier commutating switches connected in electrical parallel across positive and negative polarity input circuit means, the silicon controlled rectifier extinguishing circuit means comprising in combination with said system, an electrical charge storage means corresponding to each of said silicon controlled rectifier commutating switches for storing an electrical charge, a semi-conductor extinguishing switch having at least two current carrying electrodes and a control electrode and being of the type which when forward poled may be triggered to conduction upon the application of a proper polarity signal pulse to the control electrode thereof corresponding to each of said silicon controlled rectifier commutating switches, means for connecting the series combination of a first said semi-conductor extinguishing switch, a first said electrical charge storage means, a second said electrical charge storage means and a second said semi-conductor extinguishing switch corresponding to each of said series connected pairs of said silicon controlled rectifier commutating switches across said input circuit means, the series combination of two resistors connected across each combination of said first and second said electrical charge storage means, means for electrically interconnecting the junctions between said resistors of all of said series combination of two resistors and means for connecting the junction between each combination of said first and second electrical charge storage means to the junction between the said series connected pair of said silicon controlled rectifier commutating switches to which they correspond.

6. In a direct current commutation system for brushless type electrical motors of the type having a bridge type commutating switching circuit including a plurality of series connected pairs of silicon controlled rectifier commutating switches connected in electrical parallel across positive and negative polarity input circuit means, the silicon controlled rectifier extinguishing circuit means comprising in combination with said system, a capacitor corresponding to each of said silicon controlled rectifier commutating switches for storing an electrical charge, a semi-conductor extinguishing switch having at least two current carrying electrodes and a control electrode and being of the type which when forward poled may be triggered to conduction upon the application of a proper polarity signal pulse to the control electrode thereof corresponding to each of said silicon controlled rectifier commutating switches, means for connecting the series combination of a first said semi-conductor extinguishing switch, a first said capacitor, a second said capacitor and a second said semi-conductor extinguishing switch corresponding to each of said series connected pairs of said silicon controlled rectifier commutating switches across said input circuit means, the series combination of two resistors connected across each combination of said first and second capacitors, means for electrically interconnecting the junctions between said resistors of all of said series combination of two resistors and means for connecting the junction between each combination of said first and second capacitors to the junction between the said series connected pair of said silicon controlled rectifier commutating switches to which they correspond.

7. A direct current commutation system for brushless type electrical motors comprising, positive and negative polarity input circuit means, a bridge type commutating switching circuit including a plurality of series connected pairs of silicon controlled rectifier commutating switches, means for connecting said series connected pairs of silicon controlled rectifier commutating switches in parallel across said input circuit means, a capacitor corresponding to each of said silicon controlled rectifier commutating switches for storing an electrical charge, a silicon controlled rectifier switch corresponding to each of said silicon controlled rectifier commutating switches, means for connecting the series combination of a first said silicon controlled rectifier extinguishing switch, a first said capacitor, a second said capacitor and a second said silicon controlled rectifier extinguishing switch corresponding to each of said series connected pairs of said silicon controlled rectifier commutating switches across said input circuit means, the series combination of two resistors connected across each combination of said first and second capacitors, means for electrically interconnecting the junctions between said resistors of all of said series combination of two resistors and means for connecting the junction between each combination of said first and second capacitors to the junction between the said series connected pair of said silicon controlled rectifier commutating switches to which they correspond.

References Cited

UNITED STATES PATENTS

| | | | |
|---|---|---|---|
| 3,207,974 | 9/1965 | McMurray | 321—45 |
| 3,213,287 | 10/1965 | King | 321—45 XR |
| 3,219,905 | 11/1965 | Davis et al. | 321—8 |
| 3,262,036 | 7/1966 | Clarke et al. | 318—227 XR |
| 3,321,697 | 5/1967 | Etter | 321—45 |
| 3,340,453 | 9/1967 | Bradley et al. | 321—5 |
| 3,354,370 | 11/1967 | Corry et al. | 318—227 |
| 3,355,654 | 11/1967 | Risberg | 321—45 XR |

JOHN F. COUCH, *Primary Examiner.*

WILLIAM M. SHOOP, *Assistant Examiner.*

U.S. Cl. X.R.

318—138, 254